United States Patent Office 3,534,052
Patented Oct. 13, 1970

3,534,052
METHYL ESTER OF 6' - ETHYL - 2',3',6',7',8',8'a-HEXAHYDRO - 4 - METHOXY - α-(METHOXY-METHYLENE) - 3 - OXOSPIRO[INDOLINE - 2,1' (5'H)-INDOLIZINE]-7'-ACETIC ACID
Bryce Douglas, Phoenixville, Joseph F. Pagano, Paoli, and Joseph R. Valenta, Strafford, Pa., and John E. Zarembo, Trenton, N.J., assignors to Smith Kline & French Laboratories, Philadelphia, Pa., a corporation of Pennsylvania
No Drawing. Filed Sept. 4, 1968, Ser. No. 757,509
Int. Cl. C07d 39/00
U.S. Cl. 260—294.3            1 Claim

ABSTRACT OF THE DISCLOSURE

A new compound having analgesic activity is prepared from the alkaloid mitragynine either using a micro-organism or a chemical oxidizing agent.

---

This invention relates to a new chemical compound having pharmacodynamic activity. In particular, the compound of this invention has analgesic activity as demonstrated in the D'Amour Smith test in rats at doses of 2.5 to 10 mg./kg. orally.

The new compound of this invention is the methyl ester of 6' - ethyl-2',3',6',7',8',8'a-hexahydro - 4 - methoxy-α-(methoxymethylene) - 3 - oxospiro[indoline-2,1'(5'H)-indolizine]-7'-acetic acid which is represented by the following formula:

FORMULA I

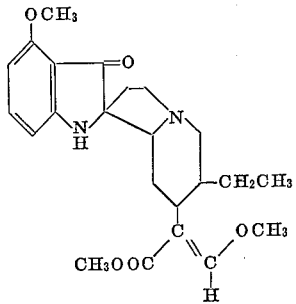

The compound of this invention is prepared from the alkaloid mitragynine which is represented by the following formula:

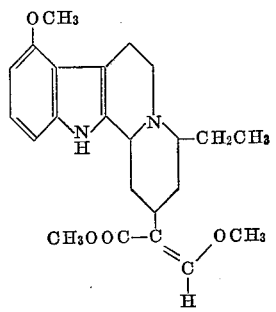

Mitragynine is subjected to the action of the fungus Helminthosporium sp. SK&F 149, ATCC 20154, a culture of which is on deposit and available to the public from the American Type Culture Collection, Rockville, Md. Alternatively, other suitable micro-organisms capable of carrying out this reaction may be used.

The micro-organism is first cultivated in a medium favorable to its development. For the fungus Helminthosporium sp. SK&F 149, ATCC 20154, a suitable nutrient medium is 0.5–2% glucose, preferably 0.5%, in 1–5%, preferably 2%, aqueous corn steep liquor. Other media such as malt extract broth, soybean meal broth, peanut meal broth or Czapek-Dox broth may be used. The media should contain sources of available carbon, nitrogen and minerals.

Carbohydrates such as starches, dextrins and sugars, including hexoses and pentoses, may be used to furnish the energy and carbon requirements of the micro-organism. However, other sources of carbon may also be used, for example, citric acid and its salts, sodium acetate, or the sodium or potassium salts of other low molecular weight fatty acids or alcohols.

Sources of nitrogen in assimilable form can be made available by soluble or insoluble vegetable or animal proteins, or protein derivatives such as corn steep liquor, soybean meal, peanut meal, casein, meat extracts, peptones and yeast extract. Amino acids, ammonium salts or nitrates can also be used.

Minerals naturally present in the above complex carbon and nitrogen sources are usually sufficient to satisfy the mineral requirements of the micro-organism. If mineral-deficient media are used, any of the commonly used physiological mineral solutions can be used satisfactorily to supplement the chemically defined medium.

The micro-organism is cultivated in the nutrient medium for about 48 hours.

A sterile air supply should be maintained during the fermentation. This can be accomplished by exposing a large surface of the growth medium to the atmosphere with constant agitation, or alternatively by the use of submerged aeration devices. An aeration rate of about 0.5 to about 2.0 v.v.m. (cubic liters of air per cubic liters of growth medium per minute) may be used.

During the fermentation the temperature should be maintained within a range of about 23° C. to 32° C., preferably from about 25° C. to 30° C.

Optimum growth of the micro-organism is achieved when the pH of the fermentation is maintained within a range of about 5.0 to 6.5, preferably about 5.0, and optimum transformation of the alkaloid is achieved when the pH of the fermentation is maintained within a range of about 6 to 8.5, preferably about 8. This may be accomplished by the intermittent addition of mineral acids or bases to adjust the pH, or also by the incorporation of suitable buffering agents in the fermentation medium. Buffering agents such as calcium carbonate or potassium dihydrogen phosphate may be used.

The alkaloid mitragynine is dissolved in a suitable solvent such as aqueous lower alkanol, preferably aqueous ethanol. An acid addition salt of mitragynine is used, preferably the hydrochloride salt, or mitragynine as the free base is used with a small amount of a mineral acid such as, for example, hydrochloric acid added to the solvent to solubilize the alkaloid. The mitragynine in solution is added to the growing culture of the micro-organism to give a final concentration of mitragynine of about 0.5 mg./ml. and when a lower alkanol, such as ethanol, is used as the solvent, a final concentration of preferably no more than 1% of the lower alkanol. The addition of the alkaloid to the microbial culture should be made under aseptic conditions.

The fermentation is allowed to proceed until the transformation has progressed to the optimum stage. This usually occurs within about 3 to 6 days and is determined by periodic analysis of the fermentation system. This analysis is preferably carried out chromatographically, advantageously by thin layer chromatography. The chromatographic methods used are known to the art. A sample is withdrawn from the fermentation system, adjusted to pH of about 9.0 to 9.5, for example using concentrated ammonium hydroxide, and extracted with an organic solvent such as chloroform or diethyl ether. The extract is concentrated and chromatographed in a system such as aluminum oxide plates developed in chloroform:benzene (1:1) or silica gel G plates developed in chloroform:acetone (1:1). The plates are air dried and sprayed with an appropriate reagent to determine the presence of alkaloids, such as modified Dragendorff reagent.

When the transformation has progressed to its optimum stage, the fermentation is terminated. The pH of the fermentation broth is adjusted to about 9.0 to 9.5, for example using concentrated ammonium hydroxide, and extracted with a water immiscible organic solvent such as tetrachloroethylene or, preferably, chloroform. The whole fermentation broth, including microbial cells and aqueous supernatant fluid, can be extracted or preferably, the cellular mass of the micro-organism can first be separated from the aqueous supernatant fluid by centrifugation or filtration and then extracted.

The solvent is removed from the extract and the residue is extracted with a suitable solvent such as benzene. The extract is subjected to chormatography, conveniently column chromatography. The chromatographic methods used are known to the art. A column of adsorbent material, preferably alumina, and a series of organic solvents as eluents are used. The presence of the compound of this invention in the solvent fractions obtained after column chromatography is determined by thin layer chromatography of aliquot samples. The appropriate fractions are combined and evaporated to dryness in vacuo to give the compound of this invention, i.e. the methyl ester of 6'-ethyl - 2',3',6',7',8',8'a - hexahydro-4-methyl-α-(methoxymethylene) - 3 - oxospiro[indoline - 2,1'(5'H) - indolizine]-7'-acetic acid.

Alternatively, mitragynine is treated with a chemical oxidizing agent such as lead tetraacetate. The reaction is carried out in an organic solvent such as methylene chloride at about 5° C. for about 1–2 hours. The resulting mixture is concentrated and chromatographed. A neutral alumina column and an eluent, such as chloroform, is used. The fraction containing a diacetate compound is concentrated to dryness. The residue is hydrolyzed with base such as soduim methoxide or ammonium hydroxide to give the compound of this invention (Formula I).

The following examples are illustrative of the processes for preparing the compound of this invention.

EXAMPLE 1

The pH of 9.5 liters of 0.5% glucose in 2% corn steep liquor in a ten liter fermenter is adjusted to 5.0 and the solution is autoclaved for 75 minutes at 17 p.s.i. and 121° C.

Helminthosporium sp. SK&F 149, ATCC 20154, is grown in 500 ml. of 0.5% glucose in 2% corn steep liquor for 48 hours. This culture is introduced into the above prepared medium and the system is then incubated for 48 hours at 30° C. at 200 r.p.m. with aeration at 0.5 v.v.m. The pH is adjusted to 8.0 with 1 N aqueous sodium hydroxide solution. Mitragynine hydrochloride (10.88 g.) in 100 ml. of 95% ethanol and 100 ml. deionized water are added.

The fermentation is allowed to proceed at 30° C. with agitation at 250 r.p.m. and aeration at 1 v.v.m. The pH of the fermentation broth is monitored and adjusted to maintain it at 8.0. Samples (4–5 ml.) are taken at intervals. The broth samples, following adjustment to pH 9.2, are shaken with an equal volume of diethyl ether. The ether phase is decanted off and concentrated in vacuo at 30° C. The residue is spotted on neutral alumina thin layer chromatography plates. The plates are developed in chloroform:benzene (1:1), then air dried and sprayed with modified Dragendorff reagent to determine the progress of the transformation.

After 50 hours the fermentation is terminated. The pH is adjusted to 9.2 The fermentation broth is centrifuged and the supernatant broth is then decanted off and extracted with half its volume of chloroform. The chloroform extract is evaporated to dryness in vacuo. Benzene is added to the residue and the mixture is filtered. The benzene filtrate is evaporated to dryness in vacuo. Cyclohexane is added to the residue and the mixture is filtered. The cyclohexane filtrate is placed on a neutral alumina column. The following solvents are used as eluents: cyclohexane, toluene, diethyl ether, chloroform and methanol. Fractions are collected and samples of each fraction are analyzed by thin layer chromatography.

The fractions containing the metabolite are combined and evaporated to dryness in vacuo. The residue is dissolved in cyclohexane with a small amount of toluene. This solution is placed on a neutral alumina column and chromatographed again using the same solvents as eluents.

The fractions containing the metabolite are combined and evaporated to dryness in vacuo to give the methyl ester of 6'-ethyl-2',3',6',7',8',8'a-hexahydro-4-methoxy-α-(methoxymethylene) - 3 - oxospiro[indoline-2,1'(5'H)-indolizine]-7'-acetic acid.

EXAMPLE 2

Mitragynine (1 g.) is dissolved in 40 ml. of methylene chloride. To the solution is added 1.3 g. of lead tetraacetate in 25 ml. of methylene chloride over about 15 minutes while stirring at 5° C. The mixture is then stirred at 5° C. for one hour.

The reaction mixture is then diluted with 50 ml. of methylene chloride and washed with dilute ammonium hydroxide.

The organic layer is washed with water, dried over magnesium sulfate, concentrated and chromatographed over neutral alumina eluted with chloroform.

The second fraction is collected and concentrated in vacuo. The residue is dissolved in methanol and treated with sodium methoxide. The resulting mixture is heated on a steam bath for 30 minutes and extracted with chloroform. The chloroform layer is dried over magnesium sulfate and evaporated to give the methyl ester of 6'-ethyl-2',3',6',7',8',8'-a - hexahydro - 4 - methoxy - α - methoxymethylene) - 3 - oxospiro[indoline - 2,1'(5'H)-indolizine] 7'-acetic acid.

What is claimed is:
1. A compound of the formula:

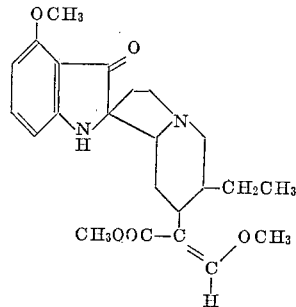

References Cited

Trager et al., Tetrahedron 24 (2), 523–43 (1968).

HENRY R. TILES, Primary Examiner

G. T. TODD, Assistant Examiner

U.S. Cl. X.R.

195—51; 424—267